United States Patent
Zoppi et al.

(10) Patent No.: US 9,625,038 B2
(45) Date of Patent: Apr. 18, 2017

(54) GASKET FOR A VALVE OF AN INTERNAL COMBUSTION ENGINE

(71) Applicant: FREUDENBERG SEALING TECHNOLOGIES S.A.S. DI EXTERNA ITALIA S.R.L.U, Pinerolo (TO) (IT)

(72) Inventors: Claudio Zoppi, Pinerolo (IT); Andrea Giordano, Pinerolo (IT); Paolo Fervier, Pinerolo (IT); Daniele Bordabossana, Pinerolo (IT)

(73) Assignee: FREUDENBERG SEALING TECHNOLOGIES S.A.S. DI EXTERNA ITALIA S.R.L.U. (IT)

( * ) Notice: Subject to any disclaimer, the term of this patent is extended or adjusted under 35 U.S.C. 154(b) by 146 days.

(21) Appl. No.: 14/568,319

(22) Filed: Dec. 12, 2014

(65) Prior Publication Data
US 2015/0167850 A1 Jun. 18, 2015

(30) Foreign Application Priority Data
Dec. 13, 2013 (IT) .............................. TO2013A1018

(51) Int. Cl.
*F16K 1/46* (2006.01)
*F01L 3/08* (2006.01)

(52) U.S. Cl.
CPC ..... *F16K 1/46* (2013.01); *F01L 3/08* (2013.01); *F01L 2101/00* (2013.01)

(58) Field of Classification Search
CPC . F01L 3/08; F01L 2101/00; F01L 3/10; F16K 1/46; F16K 17/0433; F16K 1/36
USPC ..... 123/188.36, 188.1, 188.2, 188.3, 190.12, 123/190.17, 188.8, 188.12, 188.13, 123/188.17; 277/502; 251/214
See application file for complete search history.

(56) References Cited

U.S. PATENT DOCUMENTS

| | | | | |
|---|---|---|---|---|
| 3,480,286 A | * | 11/1969 | Kosatka | ............... F01L 3/08 123/188.6 |
| 4,773,363 A | | 9/1988 | Stritzke | |
| 4,811,703 A | | 3/1989 | Rericha et al. | |
| 5,553,869 A | * | 9/1996 | Stamback | ............. F01L 3/08 123/188.6 |
| 6,227,548 B1 | | 5/2001 | Netzer | |

(Continued)

FOREIGN PATENT DOCUMENTS

| | | |
|---|---|---|
| EP | 2065573 | 6/2009 |
| JP | S5639803 | 4/1981 |

OTHER PUBLICATIONS

Italian Search Report, for corresponding IT priority application No. 1020131018, filed Dec. 13, 2013. IT.

*Primary Examiner* — Long T Tran
(74) *Attorney, Agent, or Firm* — The Belles Group, P.C.

(57) ABSTRACT

There is described a gasket for a valve of an internal combustion engine; the valve comprises a guide element defining a through seat, and a stem slidably moving in such a seat; the gasket comprises an elastically deformable seal element, having an annular configuration with respect to an axis and adapted to be fitted externally on said valve to cooperate with the stem and/or with the guide element; and a support member having an annular shape, fitted coaxially on at least part of the seal element; the support member is formed by a single component made entirely of plastic material.

20 Claims, 7 Drawing Sheets

(56) References Cited

U.S. PATENT DOCUMENTS

| | | | | |
|---|---|---|---|---|
| 6,764,079 B1* | 7/2004 | Hegemier | ............ | F01L 3/08 |
| | | | | 123/188.6 |
| 2003/0098432 A1* | 5/2003 | Hegemier | ............ | F01L 3/08 |
| | | | | 251/214 |
| 2004/0021122 A1* | 2/2004 | McArthy | ............ | F01L 3/08 |
| | | | | 251/337 |
| 2005/0001196 A1* | 1/2005 | Mc Arthy | ............ | F01L 3/08 |
| | | | | 251/214 |
| 2005/0040603 A1* | 2/2005 | Leimer | ............ | F01L 3/08 |
| | | | | 277/502 |
| 2006/0027977 A1 | 2/2006 | Leimer et al. | | |

\* cited by examiner

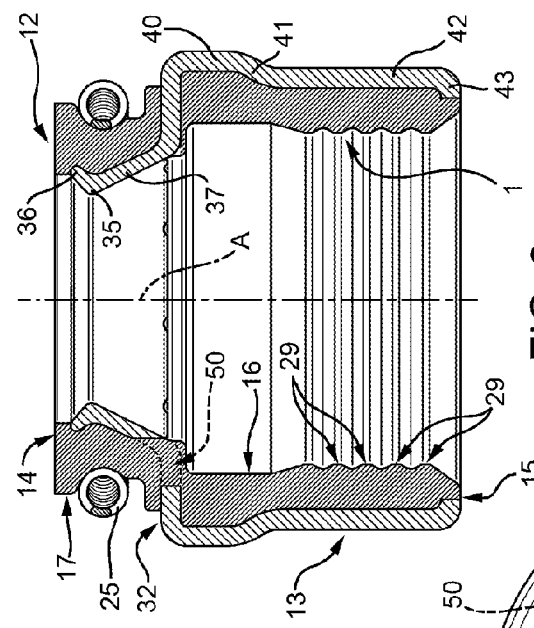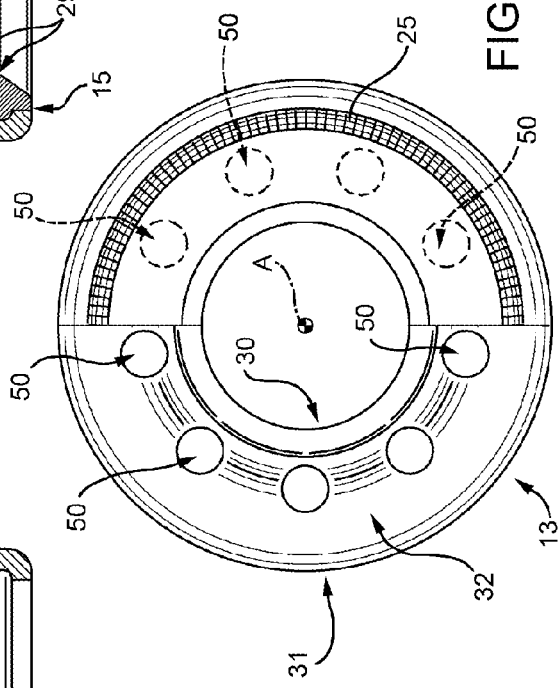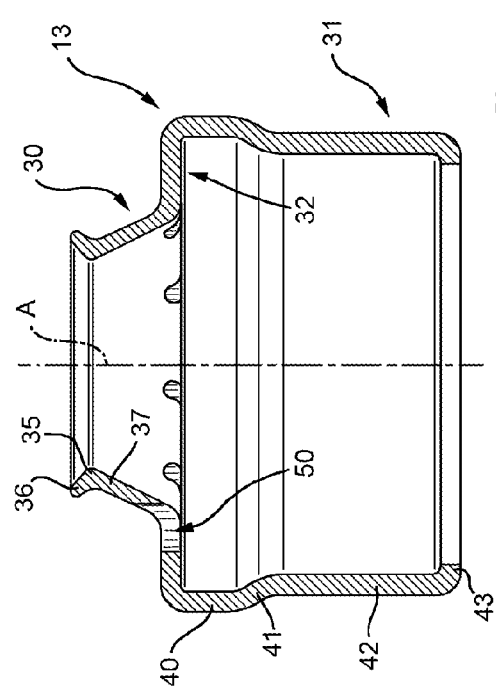

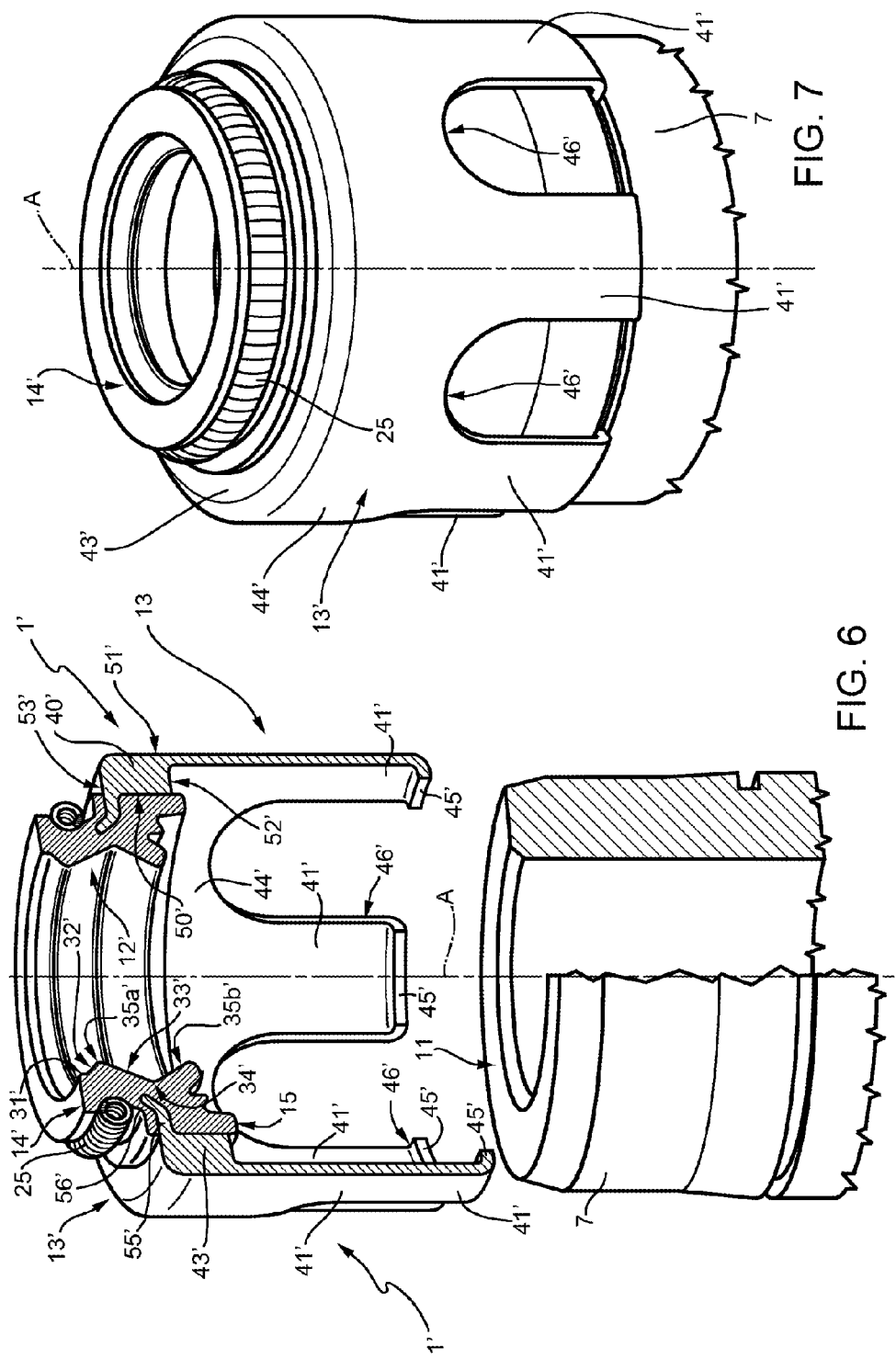

GASKET FOR A VALVE OF AN INTERNAL COMBUSTION ENGINE

CROSS-REFERENCE TO RELATED APPLICATIONS

The present application claims priority under 35 U.S.C. §119 to Italian Patent Application No. TO2013A01018, filed Dec. 13, 2013, the entirety of which is incorporated herein by reference.

FIELD OF INVENTION

The present invention relates to a gasket for a valve of an internal combustion engine.

BACKGROUND OF THE INVENTION

Internal combustion engines for vehicles are known, comprising a head having one or more cylinders, inside which the engine cycle is carried out, and which are put in communication with respective combustion chambers of the engine itself. Suitable seats are further made on said head intended to put the combustion chamber in communication with ducts adapted to introduce a mixture of unburnt fuel and air in said chamber ("intake ducts"), and to remove the flue gases ("exhaust ducts") from said combustion chamber.

The flows from and towards each combustion chamber are controlled by appropriate valves acting on said seats. In particular, each valve essentially comprises a guide element fixed within a cavity of the engine head and a stem slidably movable in opposite directions within a through seat defined by the guide element and bearing a closing portion at one end to close the connection between the relative intake or exhaust duct and the corresponding combustion chamber.

The opposite end of the valve stem axially protrudes from the relative guide element and is adapted to receive driving forces from a relative control device, such as a camshaft.

The valve stem is axially loaded by a cylindrical helical spring in the closing direction of the connection between the relative intake or exhaust duct and the corresponding combustion chamber.

In particular, the spring is mounted coaxially around the valve and is axially interposed between a fixed surface formed on the engine head and a plate fixed to the valve stem in the proximity of or at the end of the stem itself cooperating with the control device.

Sealing gaskets are normally fitted on the valves of the type described above for the lubricant oil normally circulating in the engines. Such gaskets, in one of the most commonly known shapes, include a support or reinforcement member, having a substantially tubular shape and made in a single piece of metal material, and an annular seal element, made of elastomeric material and interposed between the support member and the valve.

In particular, the seal element typically comprises a first portion adapted to cooperate, through an inner radial surface thereof, with the outer radial surface of the portion of the guide element facing in use said control device, and a second portion adapted to cooperate directly with the valve stem.

The gaskets of the type described above are widely used on all internal combustion engines to control the amount of lubricating oil that flows from the distribution area to the combustion chambers. An excessive flow of lubricating oil, in addition to an obvious excessive consumption of the oil itself, causes a deterioration of the engine efficiency and a reduction in the performance of the vehicle catalyst. On the other hand, an insufficient flow causes an increase of wear and noise of the valves accompanied by the presence of local temperature peaks. These phenomena may lead to a premature failure of the valves consequent to the seizure of the stem of the valves themselves inside the guide element.

The known gaskets allow, through the first portion of the seal element acting on the guide element of the relative valve, the achievement of a static seal and, through the second portion of the seal element cooperating with the stem, the achievement of a dynamic seal.

In particular, the static seal must ensure a certain degree of radial compression on the guide element in order to prevent the leakage of lubricant oil towards the combustion chambers and at the same time keep the gasket itself in position, while the dynamic seal is designed to allow the minimum oil flow needed to lubricate the coupling between stem and guide element.

In order to reduce the sliding friction against the stem, a ring of a low friction coefficient material, such as PTFE, cooperates with the second portion of the seal element.

The support member includes: a main portion, substantially cylindrical; a first annular flange, extending radially inwards from an axial end of the main portion and partly embedded in an annular seat of the seal element; and a second annular flange extending radially outwards from one opposite axial end of the main portion.

The support member further allows keeping into operation the gasket in the desired position on the valve.

The need is felt in the field to have gaskets having the maximum flexibility as regards the shape of the support member and/or the relative position of the support member with respect to the seal element and/or the fulfillment of the static and dynamic seal functions of the support member and/or the seal element.

U.S. Pat. Nos. 4,773,363, 6,227,548 and US-A-2006/027977 describe a gasket according to the preamble of claim 1.

SUMMARY OF THE INVENTION

The object of the present invention is to provide a gasket for a valve of an internal combustion engine which allows meeting the above need in a simple and cost-effective manner.

The above object is achieved by the present invention in that it relates, in one aspect, to a gasket for a valve of an internal combustion engine, said valve comprising a guide element defining a through seat, and a stem slidably movable in said seat; said gasket comprising: an elastically deformable seal element having an annular shape with respect to an axis and adapted to be fitted externally on said valve to cooperate with said stem and/or with said guide element; and a support member having an annular shape, fitted coaxially on at least part of said seal element; said support member being formed of one single component made entirely of plastic material; wherein said support member comprises a first portion cooperating with a first portion of said seal element in a radially internal position with respect to said axis and adapted to be interposed radially between said seal element and said stem.

The present invention further relates, in another aspect, to a gasket for a valve of an internal combustion engine; said valve comprising a guide element defining a through seat, and a stem slidably movable in said seat; said gasket comprising: an elastically deformable seal element having an annular shape with respect to an axis and adapted to be fitted externally on said valve to cooperate with said stem and/or with said guide element; and a support member having an annular shape, fitted coaxially on at least part of said seal element; said support member being formed of one single component made entirely of plastic material; said support member comprising at least a first component which can be snap-coupled to said stem; wherein said seal element comprises a first annular lip adapted to tightly cooperate with said stem; said support member comprising a second annular lip embedded inside said seal element and arranged on the axially opposite side with respect to said first component.

Finally, the present invention relates, in yet another aspect, to a gasket for a valve of an internal combustion engine; said valve comprising a guide element defining a through seat, and a stem slidably movable in said seat; said gasket comprising: an elastically deformable seal element having an annular shape with respect to an axis and adapted to be fitted externally on said valve to cooperate with said stem and/or with said guide element; and a support member having an annular shape, fitted coaxially on at least part of said seal element; said support member being formed of one single component made entirely of plastic material; wherein said support member comprises a first portion placed radially inside with respect to said seal element, radially spaced from said seal element and slidingly cooperating with said stem.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Three preferred embodiments will now be described for a better understanding of the present invention by way of a non-limiting example only, with reference to the accompanying drawings, in which:

FIG. 2 is an axial sectional view of a support member of the gasket in FIG. 1;

FIG. 3 is an axial sectional view of the gasket in FIGS. 1 and 2;

FIG. 4 is a partly sectional top view of the gasket in FIGS. 1 to 3;

FIG. 6 is a partly exploded perspective view of a gasket for a valve of an internal combustion engine according to a second embodiment of the present invention, with parts removed for clarity;

FIG. 7 is a perspective view of the gasket in FIG. 6;

DETAILED DESCRIPTION OF THE INVENTION

Figure 1:
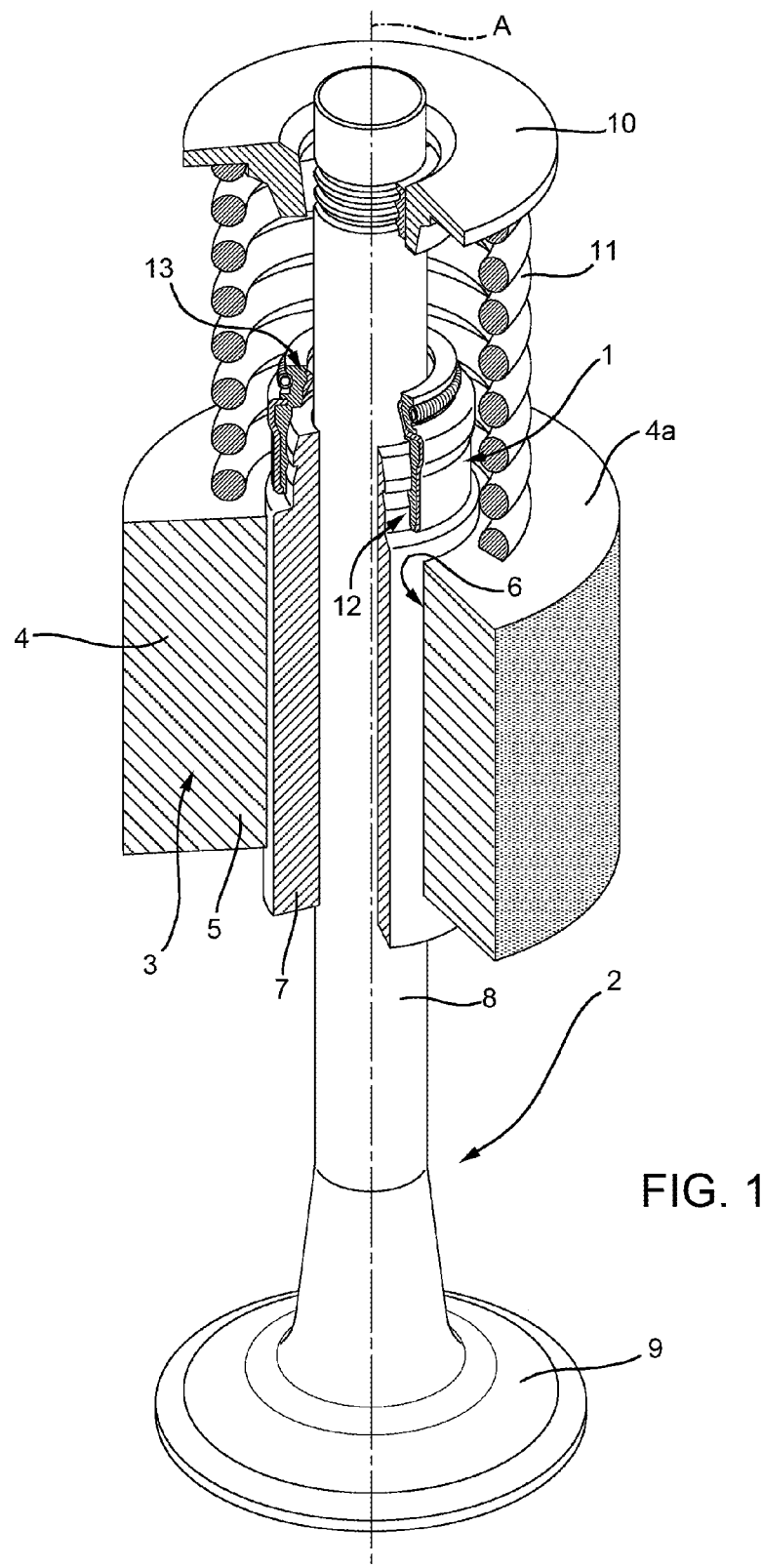
FIG. 1 is a perspective partly sectional view of a portion of an internal combustion engine provided with a gasket for a valve made according to a first embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

With reference to the accompanying FIGS. 1 to 5, reference numeral 1 indicates as a whole a gasket according to the present invention for a valve 2 of an internal combustion engine 3, per se known and shown in FIG. 1 only to the extent necessary for understanding the present invention.

In greater detail, in FIG. 1 engine 3 is only shown by a portion 4 of a head 5, which defines in a known manner a combustion chamber (not visible in FIG. 1 but arranged below portion 4 of head 5 shown), inside which a fuel is oxidized in the presence of combustion air so as to transform the chemical energy contained in the fuel into pressure energy. The combustion chamber receives in known manner, through an opening thereof, a mixture comprising the fuel and the combustion air and discharges, through another opening, the flue gas and the air at the end of the combustion process. The flows towards and from the combustion chamber are controlled by respective valves 2 of the type mentioned above, acting on said openings of the combustion chamber itself.

The following description will refer for simplicity to a single valve 2, it being understood that the same features described are present in each valve of this type used in engine 3.

With reference to FIGS. 1 to 5, valve 2 is accommodated in a through seat 6, which is formed in portion 4 of head 5 and normally contains lubricant oil. Valve 2 comprises a tubular guide element 7 fitted by interference inside seat 6, and a stem 8 slidably movable in opposite directions along axis A within the guide element 7. In greater detail, stem 8 protrudes from opposite sides of the guide element 7 and is provided, at opposite axial ends thereof, respectively, with a closing element 9, intended to sealingly engage the relative opening in the combustion chamber, and an actuating element or plate 10 adapted to receive driving forces from a control mechanism, per se known and not shown, such as a camshaft.

A relative gasket 1 according to the invention is externally fitted on the axial end portion of the guide element 7, from which the end of stem 8 provided with plate 10 protrudes, coaxially surrounding both the guide element 7 and stem 8.

Valve 2 further comprises a spring 11, in the example shown of the helical type having axis coincident with axis A, which cooperates, at mutually opposite axial ends thereof, with plate 10 and with a fixed annular surface 4a with axis A of portion 5 of head 4. Spring 11 is adapted to generate an elastic return force on stem 8 such as to always keep it in contact, at the closing element 9, with the control mechanism.

With particular reference to FIGS. 2 to 4, gasket 1 has an annular shape with respect to an axis coinciding, in assembly conditions, with axis A. More precisely, gasket 1 essentially includes:

a seal element 12 made of elastomeric material, having annular shape with respect to axis A and fitted externally on the guide element 7 to achieve a static seal on the guide element 7 itself; and a support member 13 also having annular shape with respect to axis A cooperating with the seal element 12.

The support member 13 is formed of one single component made entirely of plastic material. Preferably, the support member 13 may be made of high performance thermoplastic material with excellent mechanical and thermal resistance properties, capable of replacing the functions of the metal materials in static and dynamic applications; the thermoplastic material forming the support member 13 may be or not reinforced with suitable agents, such as organic or inorganic.

Figure 5:
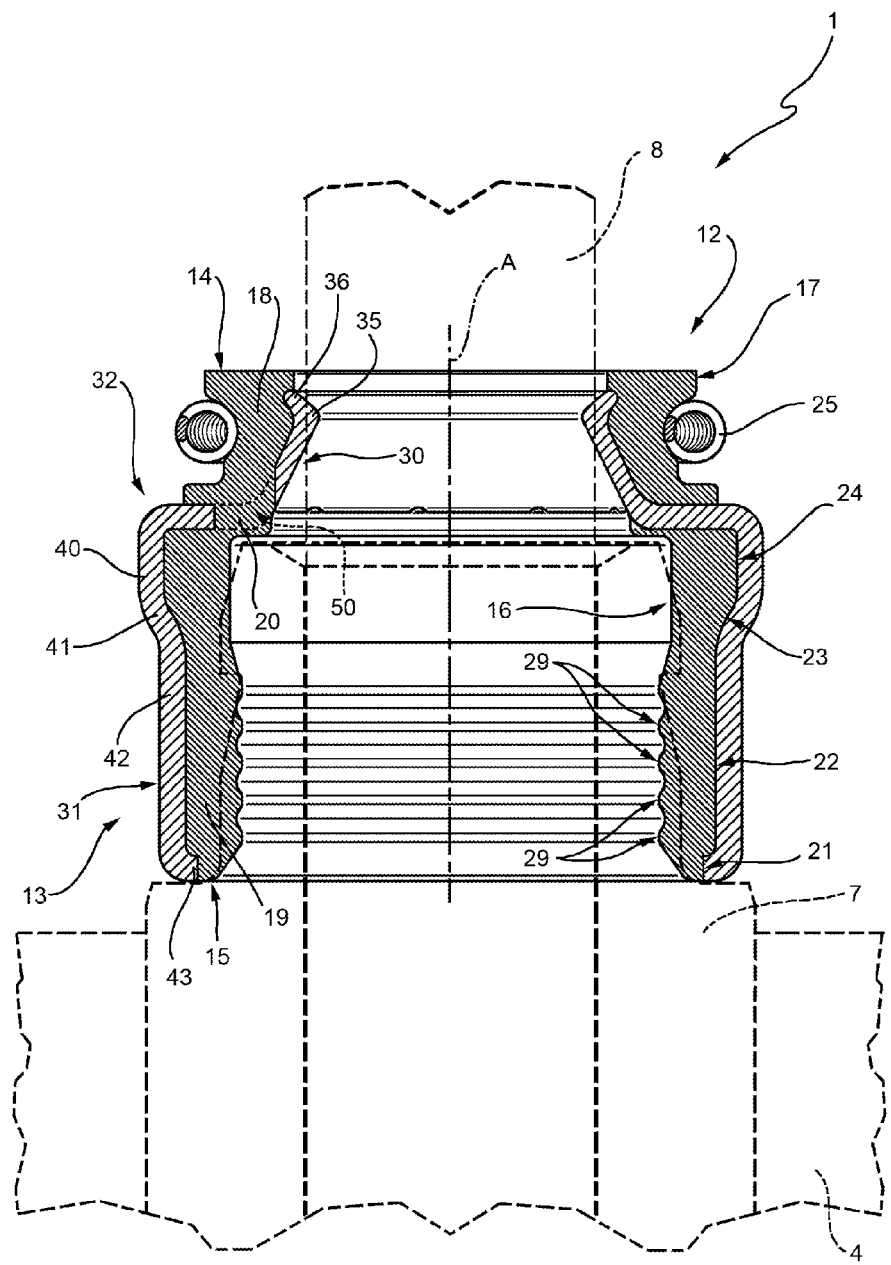
FIG. 5 is an axial section of the gasket in FIGS. 1 to 4 in mounting position on the valve in FIG. 1, with parts removed for clarity.
Figure 8:
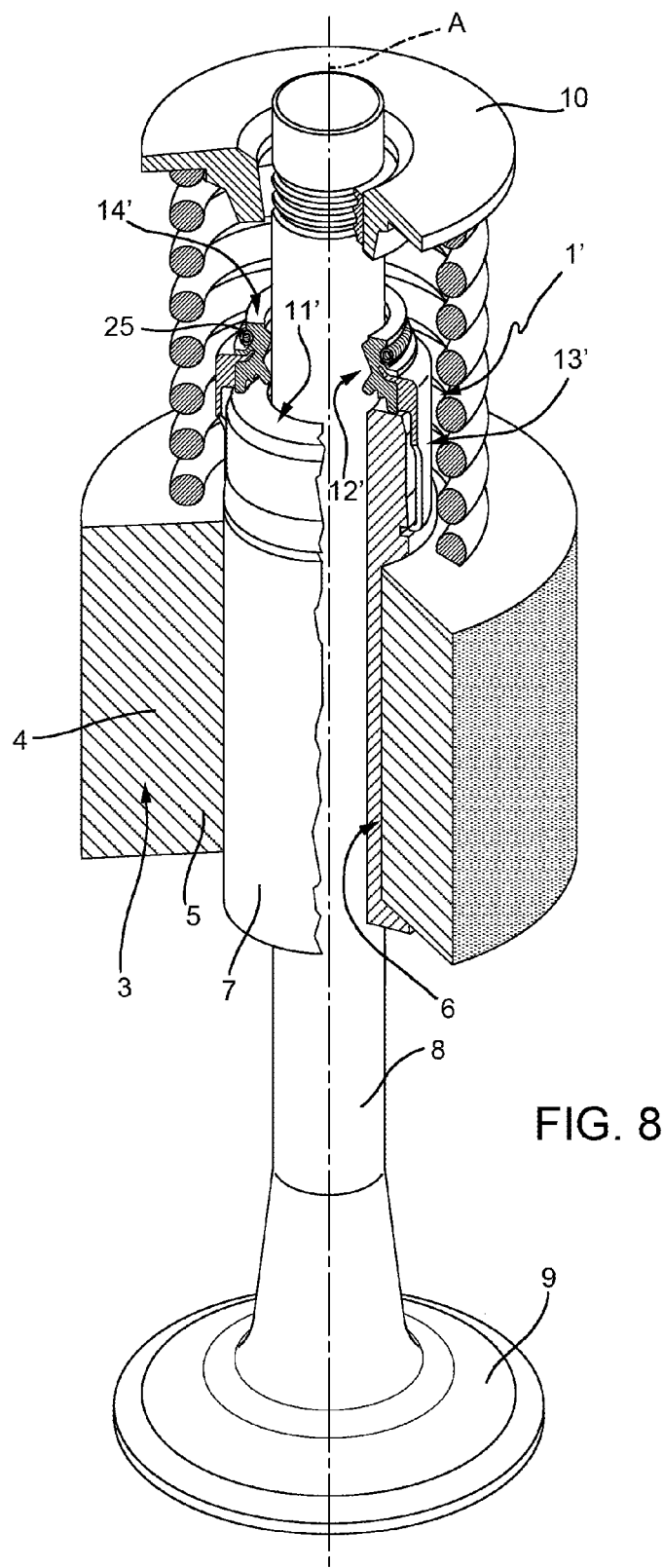
FIG. 8 is a perspective partly sectional view of a portion of an internal combustion engine provided with the gasket in FIGS. 6 and 7.

With reference to FIGS. 2 and 5, the seal element 12 is delimited by a pair of annular mutually opposite surfaces 16, 17. More precisely, surface 16 delimits the seal element 12 in radially inner position with respect to axis A and on the side of axis A. Surface 17 delimits the seal element 12 in radially outer position with respect to and on the opposite side of axis A. The seal element 12 is further axially delimited by a head surface 14 facing the opposite side of the closing element 9 and by a head surface 15, opposite to surface 14, facing the side of the closing element 9. Surfaces 16, 17 extend, each, between surface 14 and surface 15.

The seal element 12 comprises, proceeding from surface 14 towards surface 15 (FIG. 5):

a portion 18, which originates from surface 14;
a portion 20; and
a portion 19, which ends in surface 14.

In particular, portion 20 is axially interposed between portions 18, 19. Surface 16 of portion 18 is separated from stem 8 by a radial clearance. Surface 16 of portion 19 includes a plurality of undulations 29 pressed on the guide element 7 so as to define a static seal on the guide element 7 itself. In particular, the static seal ensures a certain degree of radial compression on the guide element 7 in order to prevent the leakage of lubricant oil into the combustion chamber and at the same time keep gasket 1 itself in position.

Surface 16 of portion 18 has a smaller radial size than the radial size of surface 16 of portion 19. Surface 17 of portion 18 defines an annular groove engaged by a spring 25, in this case a helical spring having axis A. The radial size of surface 17 of portion 18 decreases proceeding from surface 14 towards spring 25 and then it increases proceeding from spring 25 towards portion 20. Surface 17 of portion 18 has a smaller radial size than surface 17 of portion 19. Surface 17 of portion 19 has, proceeding from surface 15 towards portion 20, an increasing radial size.

Surface 17 of portion 19 comprises, proceeding from surface 15 towards portion 20:

an axial end section 21;
an axially elongated section 22 having a greater radial size than section 21;
a curved section 23 diverging with respect to axis A; and
an axially elongated section 24 having a greater radial size than section 22.

Advantageously, the support member 13 includes (FIG. 5) a portion 30 accommodated inside portion 18 of the seal element 12, cooperating with and arranged in a radially inner position with respect to surface 16 of portion 18 of the seal element 12 itself and slidingly cooperating with stem 8, on the opposite side of portion 18 in order to define a dynamic seal.

The support member 13 further includes:

a portion 31 axially opposite to portion 30 and pressed, in a radially outer position with respect to axis A on surface 17 of portion 19 of the seal element 12; and
a portion 32 axially interposed between portions 30, 31.

Portion 30 of the support member 13 includes, in particular, a radially innermost edge 35 pressed on stem 8 so as to define the dynamic seal on stem 8 itself. The dynamic seal is designed to allow the minimum oil flow necessary to the lubrication of the coupling between stem 8 and the guide element 7. Portion 30 of the support member 13 further comprises a pair of sections 36, 37 (FIG. 2) arranged on axially opposite sides on edge 35. Sections 36, 37 are both inclined with respect to axis A. Section 36 defines an axial end of the support member 13. In particular, section 36 converges into edge 35 with a first taper angle and the section diverges from edge 35 with a second taper angle, proceeding parallel to axis A and according to the direction oriented by surface 14 towards surface 15. Preferably, the second taper angle is smaller than the first taper angle. In the specific case shown, section 37 has a greater extension than section 36.

Portion 32 extends radially to axis A and cooperates, at an end face thereof facing towards end 14, with portion 18 of the seal element 12 and, at an end face thereof facing towards end 15, with portion 19 of the seal element 12.

Portion 31 includes, proceeding from portion 32 towards surface 15 in a direction parallel to axis A:

a section 40 originating from portion 32, extending axially and pressed on section 24 of portion 19 of the seal element 12;
a curved section 41, bent towards axis A and pressed on section 23 of surface 19 of the seal element 12;
a section 42 extending axially and pressed on section 22 of surface 19 of the seal element 12; and
a section 43 radially bent towards axis A and pressed on section 21 of surface 19 of the seal element 12.

In this way, portion 19 of the seal element 12 is axially contained between section 43 and portion 32 of the support member 13.

With particular reference to FIGS. 2 to 5, the support member 13 comprises a plurality of through holes 50 crossed by portion 20 of the seal element 12, so as to allow the seal element 12 to extend both in radially inner position and in radially outer position with respect to the support member 13. In particular, holes 50 are angularly equally spaced apart about axis A and are defined partly by portion 32 and partly by portion 37 of portion 31 of the support member 13. Moreover, holes 50 have a circular shape in cross section to axis A (FIG. 4). In the example shown, the seal element 12 and the support member 13 are co-molded together.

In use, edge 35 of the support member 13 made of plastic material defines a dynamic seal on stem 8 sliding along axis A while undulations 29 of the seal element 12 of elastomeric material define a static seal on the guide element 7 fixed with respect to axis A.

With reference to FIGS. 6 to 9, reference numeral 1' indicates a gasket according to a different embodiment of the present invention. Gasket 1' is similar to gasket 1 and will be described hereafter only insofar it differs from the latter; corresponding or equivalent parts of gaskets 1 and 1' will be identified, where possible, by the same reference numerals.

In particular, gasket 1' essentially comprises (FIGS. 6 and 9):
  a seal element 12' of elastomeric material and adapted to cooperate with stem 8 to provide a seal of the dynamic type on stem 8 itself; and
  a support member 13' made of plastic material and adapted to snap-couple with the guide element 7.

The seal element 12' further cooperates with an annular head surface 11' delimiting the support member 13' on the axially opposite side of plate 10.

The seal element 12' essentially comprises:
  an annular axial end surface 14' arranged on the opposite side of plate 10; and
  an annular axial end surface 15' arranged on the side of the closing element 9' and arranged axially in abutment against surface 11' of the guide element 7.

The seal element 12' further comprises:
  a surface 16' which is radially inner with respect to axis A and extending between surfaces 14', 15'; and
  a surface 17' which is radially outer with respect to axis A and extending between surfaces 14', 15'.

Surface 16' comprises, proceeding from surface 14' towards surface 15' (FIGS. 6 and 9):
  a section 31' parallel to axis A and radially spaced apart from stem 8;
  a section 32' converging towards axis A;
  an annular edge 35a' pressed on stem 8 to achieve a first dynamic seal on stem 8 itself;
  a section 33' diverging towards axis A;
  an annular edge 34' radially spaced apart from stem 8;
  a lip 35' protruding from edge 34' towards axis A and pressed on stem 8 to achieve a second dynamic seal on stem 8 itself;
  a groove 36' (shown in FIG. 9) radially spaced apart from axis A and radially outermost of lip 35b';
  an annular edge 37' (shown in FIG. 9) radially outermost of groove 36'; and
  an end section 38' (shown in FIG. 9) substantially parallel to axis A.

Figure 9:
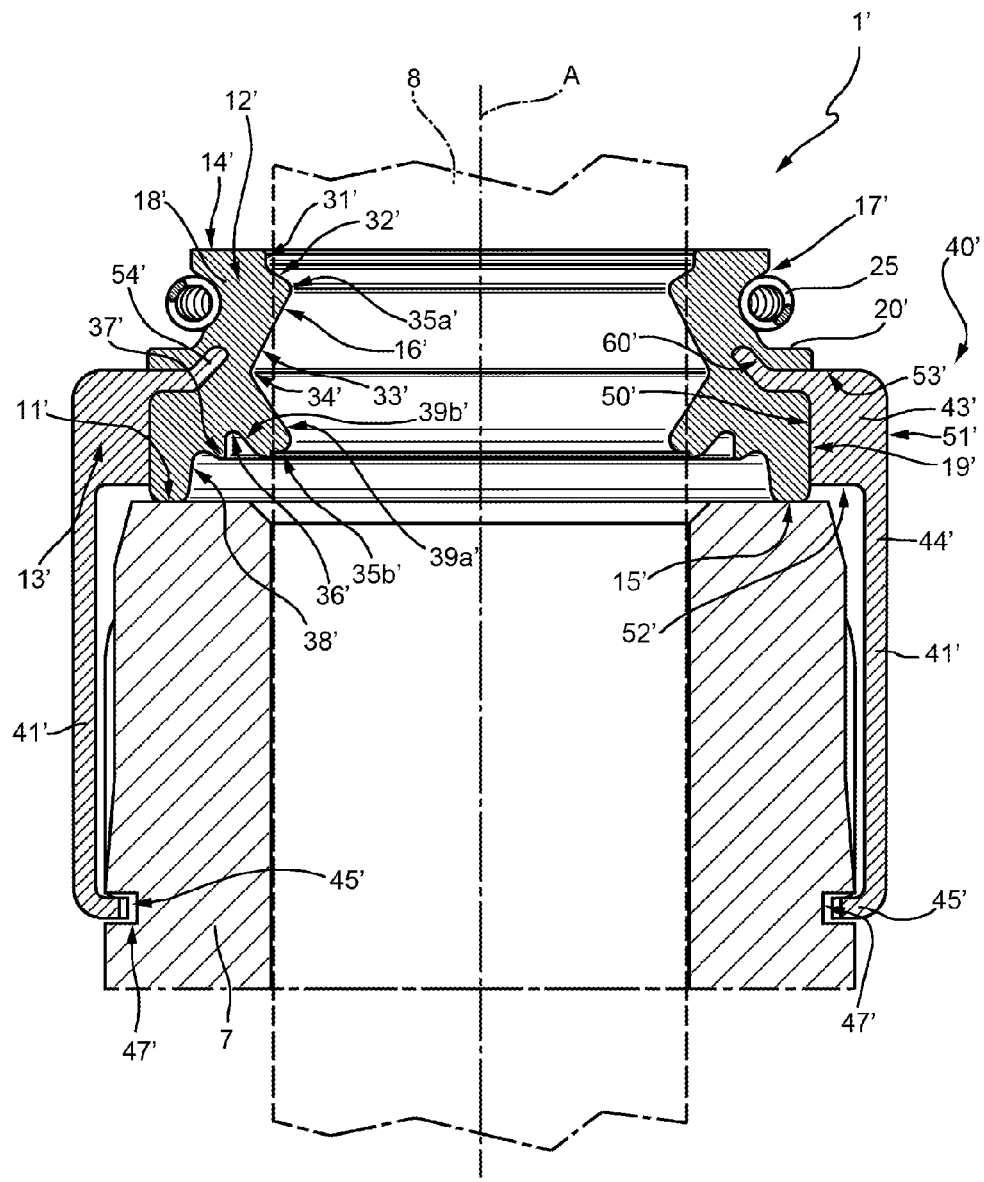
FIG. 9 is an axial section of the gasket in FIGS. 6 and 7 in mounting position on the valve in FIG. 8, with parts removed for clarity.

More precisely, lip 35b' is delimited by a pair of curved edges 39a', 39b' (FIG. 9). Edge 39a' extends from edge 34' and converges towards axis A, proceeding along surface 16' from surface 14' towards surface 15' (FIG. 9). Edge 39b' extends starting from edge 39a' towards groove 36', and moves away radially from edge 39a' and axially approaches surface 14', proceeding along surface 16' from surface 14' towards surface 15'.

Surface 17' comprises, proceeding parallel to axis A from surface 14' to surface 15':
  a section 18' defining an annular groove engaged by spring 25;
  a shoulder 20' having a mainly radial extension; and
  a section 19' having a greater diameter than section 18'.
  Shoulder 20' is axially interposed between sections 18', 19'.

The support member 13 essentially comprises:
  a main portion 40' cylindrical in shape; and
  a plurality of appendixes 41' angularly mutually equally spaced apart, axially overhanging portion 40' and comprising respective edges 45' radially bent towards axis A and adapted to snap-couple within corresponding seats 47' defined by the guide element 7'.

Portion 40' in turn includes:
  a protuberance 43' fitted in a radially outer position on section 19' of surface 17'; and
  a wall 44' having a radial thickness smaller than the protuberance 43', projecting from protuberance 43' on the opposite side of the seal element 12' and in the direction of the guide element 7, and radially spaced apart from the guide element 7.

In particular, appendixes 41' are contiguous to wall 44' and, as shown in FIGS. 6 and 7, are alternated with respective grooves 46', preferably U-shaped. In particular, grooves 46' are open in the axial direction on the side of edges 45' and are delimited, on the opposite sides of edges 45', by wall 44'. Appendixes 41' are further radially spaced apart from the guide element 7. Thanks to the fact that the support member 13' is made of plastic material, appendixes 41' can be elastically divaricated from wall 44', so as to move edges 45' away from seats 47' and/or insert the same edges 45' inside seats 47' themselves.

Portion 40' essentially comprises:
  a surface 50' which is radially inner with respect to axis A and cooperating with section 19' of surface 17';
  a surface 51' which is radially outer with respect to axis A, opposite to surface 50' and from which wall 44' originates;
  a shoulder 52' with radial extension to axis A and interposed between surface 50' and wall 44'; and
  a head surface 53' axially opposite to shoulder 52', with mainly radial extension and interposed between surfaces 50', 51'.

The support member 13' further comprises a lip 54' of annular shape buried within a seat 60' defined by the seal element 12' (FIG. 9).

In more detail, lip 54' essentially comprises (FIG. 6):
  a section 55' mainly extending in radial direction to axis A; and
  a section 56' slanting with respect to axis A and arranged radially innermost with respect to section 55'.

In the example shown, section 55' extends overhanging surface 53' towards axis A. Section 56' defines a radially inner free end of lip 54' and extends, starting from section 55', towards surface 14' of the seal element 12'. More particularly, the free end of section 56' is arranged substantially at the axial position of shoulder 20' of the support member 13'. The operation of gasket 1' differs from the operation of gasket 1 in that edge 35a' and lip 35b' of the seal element 12' define a pair of dynamic seals on stem 8, and in that surface 15' of the seal element 12' defines a static seal on surface 11' of the guide element 7.

Figure 10:
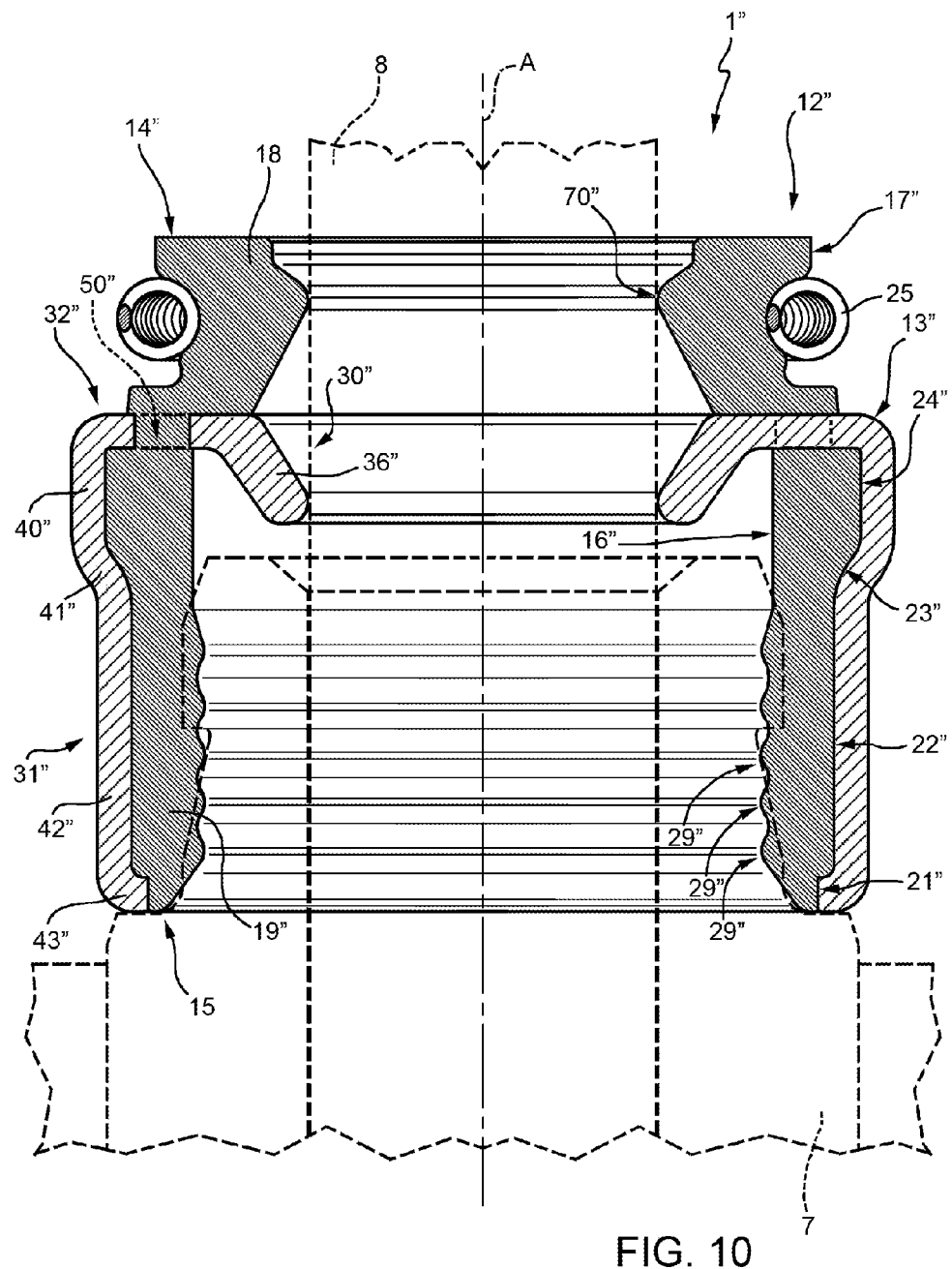
FIG. 10 is an axial section of a gasket for a valve of an internal combustion engine according to a third embodiment of the present invention, with parts removed for clarity.

With reference to FIG. 10, reference numeral 1" indicates a gasket according to a further embodiment of the present invention. Gasket 1" is similar to gasket 1 and will be described hereafter only insofar it differs from the latter; corresponding or equivalent parts of gaskets 1 and 1" will be identified, where possible, by the same reference numerals.

Gasket 1" differs from claim 1 in that portion 30" of support member 13" accommodated inside portion 19" of the seal element 12" is radially spaced apart from portion 19" itself, and slidingly cooperates with stem 8, on the side opposite to surface 16", so as to contribute to define a static seal. Therefore, portion 30" does not contact the seal element 12". More precisely, portion 30" comprises a portion 36" defining an end of the support member 13". Section 36" is pressed on stem 8. The portion 30" protrudes from portion 32" obliquely to axis A.

In the example shown, portion 30" is bent starting from portion 32" on the side of portion 31", i.e. the side of portion 19" of the seal element 12, with respect to portion 30" itself. Moreover, gasket 1" differs from gasket 1 in that portion 18" of the seal element 12" defines an annular edge 70" pressed on stem 8 to contribute to achieving a dynamic seal. In particular, edge 70" is arranged on the opposite side of section 36" with respect to portion 30". An examination of the features of gasket 1, 1' and 1" made according to the teachings of the present invention clearly shows the advantages that it allows obtaining. In particular, the support member 13, 13', 13" is formed of one single component made entirely of plastic material. Thanks to this, it is possible to achieve the maximum flexibility as regards the shape of the support member 13, 13', 13" and/or the position of the support member 13, 13', 13" with respect to the seal element 12, 12', 12".

In fact, the support member 13, 13" can be formed with a portion 30, 30" arranged radially inside portion 18, 19" of the support element 12, 12" and with a portion 31 arranged radially outside portion 19, 19" of the support element 12, 12" relative to axis A. It is therefore possible to use a plastic with a low friction coefficient to achieve the dynamic seal on stem 8, differently from the solutions known and described in the introductory part of the present description, in which the dynamic seal was achieved by a ring of low friction material that cooperates with the seal element 12, 12'.

Moreover, the support member 13' can be snap-coupled with stem 8, thanks to the fact that appendixes 41' are elastically divaricated from wall 44'. The possibility to elastically divaricate appendixes 41' from wall 43' essentially derives from the fact that the support member 13' is made of plastic material and not of metal material as in the known solutions described in the introductory part of the present description.

Finally, it is clear that changes or variations may be made to gasket 1, 1' and 1" described and shown herein without departing from the scope of protection as defined by the claims. In particular, section 56' may extend towards the closing element 9 instead of plate 10.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

The invention claimed is:

1. A gasket for a valve of an internal combustion engine; said valve comprising a guide element defining a through seat, and a stem slidably movable in said seat; said gasket comprising:
   an elastically deformable seal element having an annular shape with respect to an axis and adapted to be fitted externally on said valve to cooperate with said stem and/or with said guide element; and
   a support member having an annular shape, fitted coaxially on at least part of said seal element;
   said support member being formed of one single component made entirely of plastic material;
   wherein said support member comprises a first portion cooperating with a first portion of said seal element in a radially internal position with respect to said axis and adapted to be interposed radially between said seal element and said stem.

2. The gasket according to claim 1, wherein said first portion of said support member comprises:
   an annular edge adapted to provide a seal on said stem; and
   a pair of sections converging in said edge, arranged on respective opposite axial parts with respect to said edge, and arranged radially spaced, in use, from said stem.

3. The gasket according to claim 1, wherein said support member comprises:
   a second portion opposite said first portion and cooperating with a second portion of said seal element in a position radially external to said seal element with respect to said axis; and
   a third portion interposed axially between said first and second portion (30, 31) and defining a plurality of holes crossed by a third portion of said seal element interposed between said first and second portion.

4. The gasket according to claim 3, wherein said third portion of said support member comprises a pair of axial end faces both cooperating with said seal element.

5. The gasket according to claim 3, wherein said second portion comprises, on the side axially opposite to said third portion, an axial end bent radially towards said axis and cooperating axially with said seal element to axially contain the seal element itself against said third portion of the support member itself.

6. The gasket according to claim 1, wherein said support member comprises:
   a main section having a development substantially parallel to said axis; and
   a pair of sections arranged on sides axially opposite each other with respect to said main section and extending from said main section towards said axis and in a direction radial to said axis.

7. The gasket according to claim 1, wherein the support member is integrally formed as a singular monolithic component.

8. The gasket according to claim 1, wherein the seal element is formed from an elastic material that is different from the plastic material of the support member.

9. A gasket for a valve of an internal combustion engine; said valve comprising a guide element defining a through seat, and a stem slidably movable in said seat; said gasket comprising:
   an elastically deformable seal element having an annular shape with respect to an axis and adapted to be fitted externally on said valve to cooperate with said stem and/or with said guide element; and a support member having an annular shape, fitted coaxially on at least part of said seal element;

said support member being formed of one single component made entirely of plastic material;

said support member comprising at least a first component which can be snap-coupled to said stem;

wherein said seal element comprises a first annular lip adapted to tightly cooperate with said stem;

said support member comprising a second annular lip embedded inside said seal element and arranged on the axially opposite side with respect to said first component.

10. The gasket according to claim 9, wherein said support member comprises:

a main body cooperating with said seal element; and a plurality of appendixes axially overhanging said main body and defining respective radially bent ends of said main body;

each said end defining a respective said first component which can be snap-coupled to a corresponding seat supported by said guide element;

said appendixes can be elastically divaricated from said main body to allow, in use, the insertion/extraction of said bent ends into/from said respective seats.

11. The gasket according to claim 10, wherein said second annular lip has an inclined extension with respect to said axis.

12. The gasket according to claim 9, wherein said seal element comprises an axial end surface lying on a plane orthogonal to said axis and adapted to cooperate with said stem in a direction parallel to said axis.

13. A valve for an internal combustion engine, comprising:

the gasket according to claim 9;

the guide element, which comprises at least a second component snap-coupled to said first component of said support member of said gasket; and said stem, which slides inside said guide element.

14. The gasket according to claim 9, wherein the support member is integrally formed as a singular monolithic component.

15. The gasket according to claim 9, wherein the seal element is formed from an elastic material that is different from the plastic material of the support member.

16. A gasket for a valve of an internal combustion engine; said valve comprising a guide element defining a through seat, and a stem slidably movable in said seat; said gasket comprising:

an elastically deformable seal element having an annular shape with respect to an axis and adapted to be fitted externally on said valve to cooperate with said stem and/or with said guide element; and a support member having an annular shape, fitted coaxially on at least part of said seal element;

said support member being formed of one single component made entirely of plastic material;

wherein said support member comprises a first portion placed radially inside with respect to said seal element, radially spaced from said seal element and slidingly cooperating with said stem.

17. The gasket according to claim 16, wherein said seal element comprises a region sealingly pressed on said stem.

18. The gasket according to claim 17, wherein said support member comprises a second radial portion with respect to said axis and from which said first portion projects, ending in a lip cooperating with said stem; said lip extending towards a first side of the second portion and said region being arranged on a second side, opposite the first side, with respect to said second portion.

19. The gasket according to claim 18, wherein said support member comprises a third portion mainly extending along said axis; said first portion being bent starting from said second portion on the side of the third portion.

20. The gasket according to claim 16, wherein the support member is integrally formed as a singular monolithic component.

* * * * *